United States Patent Office 3,641,187
Patented Feb. 8, 1972

3,641,187
PRODUCTION OF CYCLIC TRIMERS OF DIENES
Junji Furukawa, Kyoto-shi, Kyoto-fu, and Hiroyuki Morikawa, Ibaraki-ken, Japan, assignors to Mitsubishi Petrochemical Company Limited, Tokyo-to, Japan
No Drawing. Filed Sept. 9, 1969, Ser. No. 856,499
Claims priority, application Japan, Sept. 13, 1968, 43/65,945; Apr. 5, 1969, 44/26,503; June 4, 1969, 44/43,864
Int. Cl. C07c 3/10, 3/16
U.S. Cl. 260—666 B
18 Claims

ABSTRACT OF THE DISCLOSURE

Cyclododecatrienes (i.e., cyclic trimers of 1,3-dienes) are produced by causing at least one 1,3-diene to undergo cyclotrimerization by contacting a catalyst resulting from the combining of a titanium compound (e.g., titanium tetrachloride), an organo-aluminum compound (e.g., diethyl aluminum chloride), and an electron-donor component (e.g., a phosphite, phosphine, a pyridine derivative, or a thiophene derivative).

BACKGROUND OF THE INVENTION

This invention relates generally to catalytic cyclotrimerisation and more particularly to the production of cyclododecatrienes by subjecting 1,3-dienes, particularly 1,3-diene monomers including methyl-substituted 1,3-butadiene, to catalytic cyclotrimerisation. The terms "cyclic trimer" and "cyclotrimerisation" used herein should be construed to be inclusive of "cyclic homotrimers" and "cyclic cotrimers," and "cyclohomotrimerisation" and "cyclocotrimerisation," respectively.

The catalytic cyclotrimerisation of 1,3-dienes is known and has been the subject of various researches. For example, methods wherein use is made of catalysts composed of combinations of specific titanium compounds and aluminium compounds are known.

A titanium compound-aluminum compound catalyst of this character has higher activity than known nickel catalysts and is therefore advantageous. A difficulty accompanying this class of catalyst is that it simultaneously has high activity also for the formation of high polymers, whereby it readily gives rise to the formation of by-products other than the objective oligomer.

Furthermore, the cyclotrimerisations of 1,3-butadiene and methylsubstituted 1,3-butadiene, in general, produces a poorer yield and entails more side reactions than cyclohomotrimerisation of 1,3-butadiene, and this tendency, in general, is observable also in the case where a titanium compound aluminium compound catalyst is used.

SUMMARY OF THE INVENTION

It is an object of the present invention to overcome the above mentioned difficulties by utilizing certain findings we have made and thereby to produce cyclododecatrienes in an advantageous manner through the use of titanium compound/aluminium compound/electron-donor compound catalyst.

According to the present invention, therefore, there is provided a method for producing cyclododecatrienes, i.e., cyclic trimers of 1,3-diene, which comprises causing at least one kind of 1,3-diene to contact a catalyst and thereby to undergo cyclotrimerisation, the catalyst resulting from the combining of the following three components.

(1) A titanium component (I) selected from the group consisting of titanium compounds (1) each representable by the general formula $Ti(OR)_nX_{4-n}$ and titanium compounds (2) each representable by the general formula $TiOX_2$.

(2) An organo-aluminum component (II) representable by the general formula $AlR'_2Z$.

(3) An electron-donor component (III) selected from the group consisting of compounds (3) selected from the group consisting of phosphines (a) and phosphites (b), compounds (4) selected from the group consisting of pyridine derivatives (c) each representable by the general formula

and thiophene derivatives (d) each representable by the general formula

and compounds (5) each representable by the general formula Y'—R"—Y'.

In the above set forth formulas: R denotes a hydrocarbon radical; X represents a halogen; $n$ is 0, 1, 2, 3, or 4; R' denotes a hydrocarbon radical; Z represents a halogen; Y represents an oxygen containing organic radical; each Y' represents the cyano radical, the thiocyano radical, or an alkyl or arylthio radical; and R" denotes a divalent hydrocarbon radical having from 1 to 4 carbon atoms.

The nature, details, and utility of the invention will be more clearly apparent from the following detailed description beginning with general considerations and concluding with specific examples of practice constituting preferred embodiments of the invention and with other examples for comparison and reference.

DETAILED DESCRIPTION

We have found that by causing a mixture of 1,3-butadiene and monomethyl-substituted 1,3-butadiene to undergo catalytic cyclotrimerisation through the use of a catalyst prepared by combining an electron-donor compound (3) or (4), as defined above, with a titanium compound-aluminum compound catalyst, a methyl-substituted cyclododecatriene which is a cyclocotrimer can be readily produced in a high yield.

Thus, the present invention is of great significance also from the industrial point of view particularly since the synthesis of methyl-substituted 12-membered ring compounds has been difficult by known ordinary methods as mentioned hereinbefore.

We have found further that, by suitably changing the proportions of the methyl-substituted 1,3-butadiene and 1,3-butadiene, it is possible to vary adjustably the proportions of the resulting monomethylcyclododecatriene-(1, 5,9) and dimethyl (or trimethyl) cyclododecatriene-(1,5,9).

Furthermore, an electron-donor compound (5) as defined above has heretofore been considered to be detrimental when present in polymerisation of olefins and dienes and, in fact, functions as a polymerisation inhibitor. Accordingly, our discovery that in the oligomerisation of 1,3-dienes with the use of titanium compound-organoaluminium compound catalysts, this compound (5), in actuality, functions to suppress the formation of by-product high polymers to increase the yield of diene oligomers without suppressing the cyclotrimerisation was quite unexpected.

One of the components of the catalyst system which is used in expectancy of this result is one of the aforementioned titanium compounds representable by the general formulas given above. Representative examples of the substitution radical R are alkyl radicals, particularly those having from 1 to 4 carbon atoms, and aryl radicals, particularly phenyl and tolyl. Chlorine is ordinarily used for component X.

Accordingly, specific examples of the titanium compounds (1) are titanium tetramethoxide, titanium tetraethoxide, titanium tetrapropoxide, titanium tetrabutoxide, titanium tetraphenoxide, titanium tetrachloride, titanium tributoxychloride, and titanium butoxytrichloride. Specific examples of the titanium compounds (2) are titanyl dichloride and titanyl dibromide.

Representative examples of the aforementioned organo-aluminium compound (II) constituting the second catalyst component are those in which R' is a lower alkyl radical (of the order of $C_1$ to $C_4$), and Z is chlorine. Accordingly, specific examples of this compound (II) are dimethylaluminum monochloride, diethylaluminum monochloride, di-isopropylaluminum monochloride, di-n-propylaluminum monochloride, and dibutylaluminum monochloride.

The aforementioned electron-donor compound (III) constituting the third catalyst component can be divided broadly into the three classes described below.

One of these classes comprises phosphines (3a) and phosphites (3b). Of these compounds, those in which the hydrocarbon radicals are alkyl groups, particularly those of the order of $C_1$ to $C_6$, and those in which the aryl radicals are phenyl or tolyl are representative. Accordingly, specific examples of these electron-donor compounds (III) are triethyl phosphine, tributyl phosphine, triphenyl phosphine, 1,2-bisdiphenyl phosphinoethane, dibutyl phosphite, diethyl phosphite, diphenyl phosphite, and tributyl phosphite. These compounds may be used as mixtures of at least two thereof.

While the quantitative proportions of the three catalyst components (I), (II), and (III) can be any which will produce the desired results, we have found that, in general, a mol ratio of the organoaluminium compound (II) to the titanium compound (I) of the order from 1 to 50 and a mol ratio of the above mentioned first class of electron-donor compound (3) to the titanium compound of the order of from 0.5 to 3 are satisfactory.

Another of the above-mentioned three classes of electron-donor compounds comprises 2-substituted pyridines and 2-substituted thiophenes representable by the general formulas set forth hereinbefore.

The oxygen atom within the substituent Y, which is an oxygen-containing organic radical, may be in a position for direct connection to the hetero ring or in some other position. However, it is preferable that the substituent Y be an oxygen-containing organic radical having an oxygen atom in a position corresponding to the position of γ with respect to the hetero atom of the pyridine or thiophene ring.

It appears that in this case, as indicated in a reference example set forth hereinafter, the interaction of the hetero atom of the ring, the oxygen atom (in the γ position relative to the hetero atoms) within the substituent Y, and the titanium of the titanium compound to form a complex consisting of a five-membered ring is facilitated. The present invention, however, is not to be limited in scope by such a theory.

Specific examples of this substituent Y are the methylol radical, aldehyde radicals, ketone radicals, carboxyl radicals and functional derivatives thereof as, for example, ether derivatives, ester derivatives, and amide derivatives. Specific examples of hetero-atom compounds having a substituent of this character are 2-benzoyl pyridine, pyridine-2-aldehyde, pyridine-2-carbinol, 2-benzoyl thiophene, thiophene-2-carboxylic acid, 2-thenoyl acetone, and 2-thenoyl benzoyl methane. These compounds can be used singly or as a mixture of two or more thereof.

We have found that, in general, a mol ratio of the organo-aluminium compound to the titanium compound of from 1 to 50, preferably from 3 to 15, and a mol ratio of the electron-donor compound of the above described class (4) to the titanium compound of from 0.5 to 3, preferably from 1 to 2, are satisfactory.

The third class of electron-donor compounds are those which are representable by the general formula $$Y'—R''—Y'$$

The radical R'' in this compound may be saturated or unsaturated and may be linear or branched. The two radicals Y' in the same compound may be the same radical or different radicals. Representative compounds of this kind are those in which R'' is linear methylene, and the two radicals Y' are identical. Such compounds can be divided broadly into the following three classes. These compounds may be used in the form of mixtures thereof.

(1) Compounds in which Y' is the cyano radical (—CN)

adiponitrile
glutaronitrile
succinonitrile
malononitrile (2) Compounds in which Y' is a thiocyanate radical (—SCN)

ethane-1, 2-dithiocyanate
propane-1,3-dithiocyanate
butane-1,4-dithiocyanate (3) Compounds in which Y' is an alkyl or aryl thio radical (—SR'') (In either case from 1 to 10 carbon atoms in the radical R'' is desirable.)
1,2-diethyl thioethane
1,3-diethyl thiopropane We have found that in this case, in general, a mol ratio of the organo-aluminium compound to the titanium compound of from 1 to 50, preferably from 3 to 15, and a mol ratio of the electron donor (5) to the titanium compound of from 0.1 to 2.0, preferably from 0.1 to 0.5 produce satisfactory results.

The preparation of the catalyst according to the invention from the above defined component compounds (I), (II), and (III) can be accomplished by mixing all three compounds simultaneously or by first mixing any two of the compounds and then admixing with the mixture the third component compound. A preferable procedure, however, is to cause compounds (I) and (III) to react first and to combine the compound (complex compound) thus formed with the compound (II) to form the catalyst. The reactions between these compounds can be carried out within or outside of the polymerisation vessel.

Particularly in the case where a pyridine derivative or a thiophene derivative is used as the electron donor, the catalyst preparation process has a considerably important significance. More specifically, it is necessary to form beforehand a complex of the titanium compound (I) and the hetero atom compound (III) and to combine this complex with the organo-aluminum compound (II). The formation of the complex of compounds (I) and (III) appears to proceed with substantial rapidity, and, when these two compounds are brought into mutual contact, the rapid formation of a precipitate of a colour ranging from white to light yellow is observable.

Since the complex forming speed is thus rapid, it is possible to add the third compound (II) immediately after or substantially simultaneously with the contacting of compounds (I) and (III), particularly when the complex forming process is being carried out with ample agitation. Since a catalyst formed from these three component compounds may be prepared within or outside of the polymerisation vesel, and since the complex of compounds (I) and (III) of the above described character can be isolated, as described above, this complex can also be separately prepared beforehand and then caused to contact compound (II) in the polymerisation vessel.

Example of 1,3-dienes which are monomers to be oligomerised by the use of the above described catalysts are butadiene-1,3, substituted 1,3-butadiene such as monomethyl-substituted 1,3-butadienes as, for example, 1,3-pentadiene and isoprene in single form or in admixture thereof. As 1,3-butadiene, mixtures of 1,3-butadiene of relatively poor content thereof, such as so-called "B–B cut" or "B–B fraction," which contain olefins such as butenes as well as 1,3-butadiene, can be utilised.

As mentioned hereinbefore, the method of the present invention is particularly advantageous in the copolymerisation of methyl-substituted 1,3-butadienes and 1,3-butadiene.

The reaction of cyclotrimerisation of 1,3-butadienes according to the invention can be carried out irrespective of the presence or absence of a solvent. In general, however, the use of a solvent in carrying out the reaction is suitable. The most typical examples of solvents for this purpose are hydrocarbons such as benzene, toluene, xylene, and hexane. We have found that a reaction temperature of the order of from 0 to 100 degrees C., particularly from 20 to 70 degrees and a reaction pressure of from atmospheric to superatmospheric are suitable.

By subjecting the product formed upon completion of the reaction and condensation of the solvent to fractional distillation, cyclododecatrienes such as monomethylcyclododecatriene-(1,5,9), dimethylcyclodedocatriene-(1,5,9), trimethylcyclododecatriene - (1,5,9), and cyclododecatriene-(1,5,9) constituting a cyclic trimer can be readily obtained. The compositions of these products thus formed can be varied at will by appropriately selecting the composition of the original monomers.

These compounds are important starting materials for organic synthesis. For example, by hydrogenating cyclododecatriene and then oxidising the resulting product, a corresponding dicarboxylic acid can be obtained. Moreover, cyclododecatriene can be used as a starting material for 12-membered lactam derivatives. Furthermore, methylcyclododecatrienes are also applicable to these uses, and, in addition, ketone and lactone derivatives of the oxidation products thereof become new synthetic perfume materials.

In order to indicate still more clearly the nature and utility of the invention, the following specific examples of practice constituting preferred embodiments of the invention and results, together with comparison examples and reference examples, are set forth it being understood that these examples are presented as illustrative only, and that they are not intended to limit the scope of the invention.

EXAMPLE 1

The air within a pressure-resistant bottle of 150-cc. capacity was replaced with nitrogen gas, to which was added 40 cc. of anhydrous benzene, 1 millimol of titanium tetrabutoxide, 2 millimols of tributylphosphine, and 10 millimols of diethylaluminium chloride. 8.8 grammes (g.) of 1,3-pentadiene and 7 g. of butadiene were further charged into the bottle, which was then sealed, and the process batch was agitated for 10 hours at 40 degrees C.

A methanol hydrochloric acid solution was then added to the batch to cause decomposition of the catalyst, and after condensation of the solvent, fractional distillation was carried out under reduced presure.

As a result, a cyclic trimer fraction (boiling point of 50 to 100° C./2 mm. Hg) of 8.3 g. was obtained and found to contain 13% of dimethylcyclododecatirene-(1,5,9) (boiling point of 75 to 80° C./2 mm. Hg $n_D^{20}=1.5010$), 53% of monomethylcyclododecatriene-(1,5,9) (boiling point of 65 to 70° C./2 mm. Hg, $n_D^{20}=1.4950$), and 34% of cyclododecatriene-(1,5,9) (boiling point of 50 to 60° C./2 mm. Hg).

The structures of these components were identified by means of gas chromatography, infrared absorption spectral analysis, nuclear magnetic resonance spectral analysis, and identification of hydrogenated product.

The above described reaction was again carried out under the same conditions except for omission of tributylphosphine, whereupon 7.2 g. of a trimer fraction (boling point of 50 to 100° C./2 mm. Hg) was produced.

EXAMPLE 2

To 40 cc. of anhydrous benzene, 1 millimol of titanium tetrabutoxide, 1 millimol of triphenylphosphine, 10 millimols of diethyl-aluminium chloride, 10 g. of 1,3-pentadiene, and 4.5 g. of butadiene were added, and the resulting process batch was subjected to the process set forth in Example 1.

As a result, 6.2 g. of a cyclic trimer fraction was obtained and found to contain 18% of dimethylcyclododecatriene - (1,5,9), 60% of monomethylcyclododecatriene-1,5,9), and 22% of cyclododecatriene-(1,5,9).

When the above described process was carried out without the use of triphenylphosphine, the quantity of the trimer fraction obtained was 5.3 g.

EXAMPLE 3

To 40 cc. of anhydrous benzene, 1 millimol of titanium tetrabutoxide, 0.5 millimol of dibutyl phosphite, 10 millimols of diisobutylaluminium chloride, 8.8 g. of 1,3-pentadiene, and 7 g. of butadiene were added, and the resulting process batch was subjected to the process specified in Example 1.

As a result, a cyclic trimer fraction 7.5 g. was obtained and found to contain 14% of dimethylcyclododecatriene (1,5,9), 55% of monomethylcyclododecatriene-(1,5,9), and 31% of cyclododecatriene-(1,5,9).

EXAMPLE 4

To 40 cc. of anhydrous benzene, 1 millimol of titanium tetraethoxide, 0.5 millimol of tributyl phosphite, 10 millimols of diethylchloride aluminium, 8 g. of 1,3-pentadiene, and 7 g. of butadiene were added, and the resulting process batch was subjected to the process specified in Example 1.

As a result of cyclic trimer fraction of 7.1 g. was obtained and found to contain 12% of dimethylcyclododecatriene - (1,5,9), 55% of monomethylcyclododecatriene-(1,5,9), and 33% of cyclododecatriene-(1,5,9).

EXAMPLE 5

To 40 cc. of anhydrous benzene, 1 millimol of titanium tetramethoxide, 1 millimol of triphenylphosphine, 10 millimols of ethylchloride aluminum, 8 g. of 1,3-pentadiene, and 7 g. of butadiene were added, and the resulting process batch was subjected to the process set forth in Example 1.

As a result, a cyclic trimer fraction of 7.0 g. was obtained and found to contain 11% of dimethylcyclododecatriene - (1,5,9), 56% of monomethylcyclododecatriene-(1,5,9), and 33% of cyclododecatriene-(1,5,9).

EXAMPLE 6

To 40 cc. of anhydrous benzene, 1 millimol of titanium tetrapropoxide, 1 millimol of triphenylphosphine, 10 millimols of diethylaluminium chloride, 8 g. of 1,3-pentadiene, and 7 g. of butadiene were added, and the resulting process batch was subjected to the process set forth in Example 1.

As a result, a cyclic trimer fraction of 6.9 g. was obtained and found to contain 13% of dimethylcyclododecatriene - (1,5,9), 54% of monomethylcyclododecatriene-(1,5,9), and 33% of cyclododecatriene-(1,5,9).

EXAMPLE 7

To 40 cc. of anhydrous benzene, 1 millimol of titanium tetraphenoxide, 1 millimol of diphenyl phosphite, 10 millimols of diethylaluminium chloride, 8.8 g. of 1,3-pentadiene, and 7 g. of butadiene were added, and the resulting process batch was subjected to the process set forth in Example 1.

As a result, a cyclic trimer fraction of 7.8 g. was obtained and found to contain 14% of dimethylcyclododecatriene - (1,5,9), 50% of monomethylcyclododecatriene-(1,5,9), 36% of cyclododecatriene-(1,5,9).

EXAMPLE 8

To 40 cc. of anhydrous benzene, 1 millimol of titanium tributoxychloride, 1 millimol of triphenyl phosphine, 5 millimols of diethylaluminium chloride, 8.8 g. of 1,3-pentadiene, and 7 g. of butadiene were added, and the resulting process batch was subjected to the process specified in Example 1.

As a result a cyclic trimer fraction of 6.9 g. was obtained and found to contain 14% of dimethylcyclododecatriene - (1,5,9), 51% of monomethylcyclododecatriene-(1,5,9), and 35% of cyclododecatriene-(1,5,9).

EXAMPLE 9

To 40 cc. of anhydrous benzene, 1 millimol of titanium dibutoxydichloride, 2 millimols of diphenyl phosphite, 5 millimols of diethylaluminium chloride, 8.8 g. of 1,3-pentadiene, and 7 g. of butadiene were added, and the resulting process batch was subjected to the process set forth in Example 1.

As a result, a cyclic trimer fraction of 6.5 g. was obtained and found to contain 11% of dimethylcyclododecatriene - (1,5,9), 52% of monomethylcyclododecatriene-(1,5,9), and 37% of cyclodocatriene-(1,5,9).

EXAMPLE 10

To 40 cc. of anhydrous benzene, 1 millimol of titanium butoxytrichloride, 2 millimols of triphenyl phospine, 5 millimols of diethylaluminium diethylchloride, 8.8 g. of 1,3 - pentadiene, and 7 g. of butadiene were added, and the process batch thus mixed was processed by the procedure set forth in Example 1.

As a result, a cyclic trimer of 6.8 g. was obtained and found to contain 6% of dimethylcyclododecatriene-(1,5,9), 58% of monomethylcyclododecatriene-(1,5,9), and 36% of cyclododecatriene-(1,5,9).

EXAMPLE 11

To 40 cc. of anhydrous benzene, 1 millimol of titanium tetrachloride, 1 millimol of 1,2-bisdiphenyl phosphinoethane, 3 millimols of diethylaluminium chloride, 10 g. of 1,3-pentadiene, and 5 g. of butadiene were added, and the process batch thus formed was processed in accordance with procedure set forthin Example 1.

As a result, a cyclic trimer fraction of 7.1 g. was obtained and found to contain 15% of dimethylcyclododecatriene - (1,5,9), 57% of monomethylcyclododecatriene-(1,5,9), and 28% of cyclododecatriene-(1,5,9).

EXAMPLE 12

To 40 cc. of anhydrous benzene, 1 millimol of titanium tetrabutoxide, 0.5 millimol of triphenyl phosphine, 10 millimols of diethylaluminium chloride, 8.8 g. of isoprene, and 7 g. of butadiene were added, and the resulting process batch was subjected to the process set forth in Example 1.

As a result, a cyclic trimer fraction 7.8 g. was obtained and found to contain 15% of dimethylcyclododecatriene (1,5,9), 65% of monomethylcyclodoecatriene(1,5,9), and 20% of cyclododecatriene(1,5,9).

EXAMPLE 13

To 40 cc. of anhydrous benzene, 1 millimol of titanium dibutoxydichloride, 1 millimol of diphenyl phosphite, 5 millimols of diethylaluminium chloride, 8.8 g. of isoprene, and 7 g. of butadiene were added, and the resulting process batch was subjected to the process set forth in Example 1.

As a result, a cyclic trimer fraction weighting 9.3 g. was obtained and found to contain 16% of dimethylcyclododecatriene(1,5,9), 62% of monomethylcyclododecatriene(1,5,9), and 22% of cyclododecatriene(1,5,9).

EXAMPLE 14

To 40 cc. of anhydrous benzene, 1 millimol of titanium tetrachloride, 2 millimols of triphenyl phosphine, 3 millimols of diethylaluminium chloride, 8.8 g. of isoprene, and 7 g. of butadiene, and the resulting process batch was subjected to the process set forth in Example 1.

As a result, a cyclic trimer fraction in a quantity of 9.5 was obtained and found to contain 23% of dimethylcyclododecatriene(1,5,9), 59% of monomethylcyclododecatriene (1,5,9), and 27% of cyclododecatriene(1,5,9).

EXAMPLE 15

To 40 cc. of anhydrous benzene, 1 millimol of titanyl dichloride, 2 millimols of tributyl phosphine, 3 millimols of diethylaluminium chloride, 8.8 g. of 1,3-pentadiene, and 7 g. of butadiene were added, and the resulting process batch was subjected to the process set forth in Example 1.

As a result, a cyclic trimer fraction of a weight of 7.5 g. was obtained and found to contain 14% of dimethylcyclododecatriene(1,5,9), 59% of monomethylcyclododecatriene(1,5,9), and 27% of cyclododecatriene(1,5,9).

EXAMPLE 16

To 40 cc. of anhydrous benzene, 1 millimol of titanium oxydiisopropoxide (titanyl diisopropoxide), 2 millimols of tributyl phosphine, 10 millimols of diethylaluminium chloride, 8.8 g. of 1,3-pentadiene, and 7 g. of butadiene were added, and the resulting process batch was processed in the manner specified in Example 1.

As a result, a cyclic trimer fraction of a weight of 7.1 g. was obtained and found to contain 15% of dimethylcyclododecatriene(1,5,9), 61% of monomethylcyclododecatriene(1,5,9), and 24% of cyclododecatriene(1,5,9).

EXAMPLE 17

Th air within a pressure-resistant bottle was replaced with nitrogen gas, to which 40 cc. of benzene, 1 millimol of titanium butoxytrichloride, and 1 millimol of 2-benzoyl pyridine were added, and then 3 millimols of diethylaluminium chloride, 7 g. of butadiene, and 9 g. of pentadiene were further charged into the bottle.

The resulting process batch was agitated for 10 hours at 40 degrees C. Then a methanol hydrochloric acid solution was added to the batch to cause decomposition of the catalyst, and, after condensation of the liquid medium, fractional distillation was carried out under reduced pressure.

As a result, a cyclic trimer fraction (boiling point of 50 to 100° C./2 mm. Hg) in a quantity of 10.9 g. was obtained. This quantity corresponded to a yield of 68% (by weight) with respect to the quantity of dienes charged. The composition of the trimer thus produced was found to be 48% of methylcyclododecatriene(1,5,9), 3% of dimethylcyclododecatriene(1,5,9), and 49% of cyclododecatriene(1,5,9).

EXAMPLE 18

With respect to 10 cc. of toluene, 1 millimol of titanium diethoxydichloride, 0.5 millimol of 2-benzoyl pyridine, 4 millimols of diethylaluminium chloride, 7 g. of butadiene, and 9 g. of isoprene were used, and the process set forth in Example 17 was carried out therewith.

As a result, a trimer fraction weighing 9 g. (56% yield) was obtained and found to contain 52% of methycyclododecatriene, 21% of dimethylcyclododecatriene, and 27% of cyclododecatriene.

EXAMPLE 19

The process set forth in Example 17 was carried out with the use of 1 millimol of titanium tetrachloride, 1 millimol of 2-benzoyl pyridine, 3 millimol of diethylaluminium chloride, 7 g. of butadiene, and 9 g. of pentadiene with respect to 40 cc. of benzene.

As a result, a trimer fraction in a quantity of 10.5 g. (65% yield) was obtained and found to contain 47% of methylcyclododecatriene, 2% of dimethylcyclododecatriene, and 51% cyclododecatriene.

EXAMPLE 20

The process specified in Example 17 was carried out with the use of 1 millimol of titanyl dichloride, 0.8 millimol of 2-benzoyl pyridine, 3 millimols of diethylaluminium chloride, 7 g. of butadiene, and 9 g. of pentadiene with respect to 40 cc. of benzene.

As a result, a trimer fraction in a quantity of 10 g. (63% yield) was obtained and found to contain 53% of methylcyclododecatriene, 2% of dimethylcyclododecatriene, and 45% of cyclododecatriene.

EXAMPLE 21

The process set forth in Example 17 was carried out with the use of 1 millimol of titanium tetrabutoxide, 0.8 millimol of pyridine-2-aldehyde, 10 millimols of diethylaluminium chloride, 7 g. of butadiene, and 10 g. of pentadiene with respect to 40 cc. of benzene.

As a result, a trimer fraction weighing 9.4 g. (59% yield) was obtained and found to contain 56% of methylcyclododecatriene, 4% of dimethylcyclododecatriene, and 40% of cyclododecatriene.

EXAMPLE 22

The process specified in Example 17 was carried out with 30 cc. of hexane, 1 millimol of titanium tetrachloride, 1 millimol of 2-pyridine carbiol, 3-millimols of diisobutylaluminium cholride, 7 g. of butadiene, and 9 g. of pentadiene.

As a result, a trimer fraction of a weight of 9.8 g. (61% yield) was obtained and found to contain 57% of methylcyclododecatriene, 2% of dimethylcyclododecatriene, and 41% of cyclododecatriene.

EXAMPLE 23

The process set forth in Example 17 was carried out with 30 cc. of xylene, 1 millimol of titanium tetrachloride, 0.8 millimol of 2-pyridine ethanol, 4 millimols of diisobutylaluminium chloride, 7 g. of butadiene, and 9 g. of isoprene.

As a result a trimer fraction in a quantity of 9.2 g. (57% yield) was obtained and found to be composed of 51% of methylcyclododecatriene, 15% of dimethylcyclododecatriene, and 34% of cyclododecatriene.

EXAMPLE 24

The process set forth in Example 17 was carried out with 40 cc. of benzene, 1 millimol of titanium tetrachloride, 1 millimol of 2-benzoyl thiophene, 3 millimols of dithylaluminium chloride, 7 g. of butadiene, and 9 g. of pentadiene.

As a result, a trimer fraction in a quantity of 8.5 g. (54% yield) was obtained and found to be composed of 58% of methylcyclododecatriene, 3% of dimethylcyclododecatriene, and 39% of cyclododecatriene.

EXAMPLE 25

The process specified in Example 17 was carried out with 40 cc. of benzene, 1 millimol of titanium triisopropoxychloride, 1 millimol of 2-benzoyl thiophene, 8 millimols of diethylaluminium chloride, 7 g. of butadiene, and 10 g. of pentadiene.

As a result, a trimer fraction in a quantity of 9.6 g. (60% yield) was obtained and found to contain 55% of methylcyclododecatriene, 4% of dimethylcyclododecatriene, and 41% of cyclododecatriene.

EXAMPLE 26

The process set forth in Example 17 was carried out with 40 cc. of benzene, 1 millimol of titanyl dibromide, 0.6 millimol of 2-benzoyl thiophene, and 4 millimol of diethylaluminium chloride, 7 g. of butadiene, and 10 g. of pentadiene.

As a result, a trimer fraction in a quantity of 9 g. (56% yield) was obtained and found to contain 54% of methylcyclododecatriene, 4% of dimethylcyclododecatriene, and 42% of cyclododecatriene.

EXAMPLE 27

The process set forth in Example 17 was carried out with 1 millimol of titanium tetrachloride, 0.6 millimol of 2-thenoyl benzoyl methane, 4 millimols of diethylaluminium chloride, 7 g. of butadiene, and 9 g. of pentadiene in 40 cc. of benzene.

As a result, a trimer fraction in quantity of 9.8 g. (61% yield) was obtained and found to be composed of 53% of methylcyclododecatriene, 4% of dimethylcyclododecatriene, and 43% of cyclododecatriene.

EXAMPLE 28

The process as specified in Example 17 was carried out with 1 millimol of titanium phenoxytrichloride, 0.6 millimol of 2-thenoyl acetone, 4 millimols of diethylaluminium chloride, 7 g. of butadiene, and 10 g. of pentadiene in 30 cc. of benzene.

As a result, a trimer in a quantity of 9.9 g. (62% of yield) was obtained and found to contain 56% of methylcyclododecatriene, 2% of dimethylcyclododecatriene, and 42% of cyclododecatriene.

EXAMPLE 29

The process as specified in Example 17 was carried out with 1 millimol of titanium tetrachloride, 0.5 millimol of thiophene-2-carboxylic acid, 4 millimols of dipropylaluminium chloride, 7 g. of butadiene, and 10 g. of pentadiene in 40 cc. of benzene.

As a result, trimer fraction in a quantity of 10 g. (63% yield) was obtained and found to contain 51% of methylcyclododecatriene, 3% of dimethylcyclododecatriene, and 46% of cyclododecatriene.

EXAMPLE 30

The process specified in Example 17 was carried out with 1 millimol of titanium methoxytrichloride, 1 millimol of 2-benzoyl thiophene, 5 millimols of dipropyl aluminium chloride, 7 g. of butadiene, and 9 g. of isoprene in 40 cc. of benzene.

As a result, a trimer fraction in a quantity of 9.6 g. (60% yield) was obtained and found to be composed of 54% of methylcyclododecatriene, 5% of dimethylcyclododecatriene, and 41% of cyclododecatriene.

REFERENCE EXAMPLE 1

The yields of trimers produced when a mixture of 1,3-dienes was used for the monomer with respectively three kinds of catalysts were determined for comparison as set forth below.

| Catalyst [1]: | Trimer yield (percent) |
|---|---|
| $AlEt_2Cl + TiCl_4$ | 34 |
| $AlEt_2Cl + TiCl_4 +$ pyridine | 35 |
| $AlEt_2Cl + Ti(OBu)Cl_3 +$ 2-benzoyl pyridine | 65 |
| (Catalyst of the invention) | |

[1] Et=ethyl. Bu=Butyl.

From the above results, it is apparent that, in the case where a mixture of 1,3-dienes is used, the use of known cyclotrimerisation catalysts results in a drop in the yields, whereas, in contrast, the catalyst of this invention affords maintenance of good yields.

The above results were obtained under the following reaction conditions.

1,3-butadiene—7 g.
1,3-pentadiene—9 g.
$C_4/C_5$ mol ratio—1
Solvent—benzene
Al/Ti mol ratio—3
Temperature—40° C.
Time—10 hrs.

REFERENCE EXAMPLE 2

The proceure set forth in Example 21 was carried out except for the use of pyridine-3-aldehyde in place of pyridine-2-aldehyde, whereupon a trimer fraction weighing 4.8 g. (30% yield) was obtained. This yield is merely of the order of one half of that when 2-substituted pyridine is used.

REFERENCE EXAMPLE 3

A catalyst was prepared in accordance with the procedure of Example 17 by mixing beforehand AlEt$_2$Cl and 2-benzoyl pyridine, whereupon the trimer fraction was found to weigh 5.8 g., which corresponded to a drop in the yield.

EXAMPLE 31

The air within a pressure-resistant bottle of 150 cc. capacity was replaced with nitrogen gas, and the bottle was then charged with 50 cc. of benzene, 1 millimol of titanium dibutoxydichloride, 0.5 millimol of adiponitrile, 6 millimols of diethylaluminium chloride, 14 g. of butadiene, and 9 g. of pentadiene. The resulting process batch was agitated for 10 hours at 40 degrees C.

Then a methanol hydrochloric acid solution was added to the batch to cause decomposition of the catalyst, and after condensation of the solvent, fractional distillation was carried out under reduced pressure.

As a result, a trimer fraction (boiling point of 50 to 100° C./2 mm. Hg) in a quantity of 18.8 g. was obtained. This quantity corresponds to a yield of 82% with respect to the quantity of the monomer charged. This trimer was found to be composed of 52% of methylcyclododecatriene-(1,5,9), 1% of dimethylcyclododecatriene-(1,5,9), and 47% of cyclododecatriene.

EXAMPLE 32

To 50 cc. of benzene, 1 millimol of titanium tetrachloride, 0.3 millimol of adiponitrile, 4 millimols of diethylaluminum chloride, 21 g. of butadiene, and 5 g. of pentadiene were added, and the resulting process batch was subjected to the process specified in Example 31.

As a result, a trimer fraction in a quantity of 23% (89% yield) was obtained and found to contain 16% of monomethylcyclododecatriene and 84% of cyclododecatriene.

EXAMPLE 33

To 50 cc. of toluene, 1 millimol of titanium phenoxytrichloride, 0.5 millimol of adiponitrile, 4 millimols of diethylaluminium chloride, 7 g. of butadiene, and 9 g. of pentadiene were added, and the resulting process batch was subjected to the process set forth in Example 31.

As a result, a trimer fraction of 11.4 g. (71% yield) was obtained and found to be composed of 61% of monomethylcyclododecatriene, 4% of dimethylcyclododecatriene and 35% of cyclododecatriene.

EXAMPLE 34

To 40 cc. of hexane, 1 millimol of titanium tetrachloride, 0.5 millimol of succinonitrile, 4 millimols of diethylaluminium chloride, 7 g. of butadiene, and 9 g. of pentadiene were added, and the resulting mixture was subjected to the process set forth in Example 31.

As a result, a trimer fraction weighing 10 g. (62% yield) was obtained and found to contain 49% of monomethylcyclododecatriene, 3% of dimethylcyclododecatriene, and 48% of cyclododecatriene.

EXAMPLE 35

To 40 cc. of benzene, 1 millimol of titanium tetrabutoxide, 0.3 of glutaronitrile, 15 millimols of diethylaluminium chloride, 7 g. of butadiene, and 9 g. of pentadiene were added, and the resulting mixture was processed as prescribed in Example 31.

As a result, a trimer fraction of 10.7 g. (67% yield) was obtained and found to contain 60% of monomethylcyclododecatriene, 4% of dimethylcyclododecatriene, and 36% of cyclododecatriene.

EXAMPLE 36

To 40 cc. of benzene, 1 millimol of titanium tetrachloride, 0.5 millimol of glutaronitrile, 4 millimols of diisobutaylaluminium chloride, 7 g. of butadiene, and 9 g. of isoprene were added, and the mixture thus formed was subjected to the process set forth in Example 31.

As a result, a trimer fraction of 12 g. (86% yield) was obtained and found to be composed of 46% of monomethylcyclododecatriene, 2% of dimethylcyclododecatriene, and 52% of cyclododecatriene.

EXAMPLE 37

To 50 cc. of toluene, 1 millimol of titanium diethoxydibromide, 0.5 millimol of adiponitrile, 3 millimols of ethylaluminium sesquichloride, 7 g. of butadiene, and 4 g. of pentadiene were added, and the resulting mixture was processed as prescribed in Example 31.

As a result, a trimer fraction of 7.9 g. (72% yield) was obtained and found to contain 33% of monomethylcyclododecatriene, 2% of dimethylcyclododecatriene, and 6.5% of cyclododecatriene.

EXAMPLE 38

To 50 cc. of toluene, 1 millimol of titanyl dichloride, 0.3 millimol of 1,2-diethylthioethane, 3 millimols of diethylaluminium chloride, 7 g. of butadiene, and 7 g. of isoprene were added, and the resulting mixture was subjected to the process set forth in Example 31.

As a result, a trimer fraction of 11.3 g. (81% yield) was obtained and found to contain 41% of monomethylcyclododecatriene, 1% of dimethylcyclododecatriene, and 58% of cyclododecatriene.

EXAMPLE 39

To 50 cc. of toluene, 1 millimol of titanyl dibromide, 0.3 millimole of malononitrile, 3 millimols of diethylaluminium chloride, 7 g. of butadiene, and 7 g. of pentadiene were added, and the mixture thus formed was processed as prescribed in Example 31.

As a result, a trimer fraction of 10.5 g. (75% yield) was obtained and found to contain 34% of monomethylcyclododecatriene, 2% of dimethylcyclododecatriene, and 65% of cyclododecatriene.

EXAMPLE 40

To 50 cc. of toluene, 1 millimol of titanium tributoxychloride, 0.3 millimol of 1,2-diphenylthioethane, 3 millimols of ethylaluminium sesquichloride, 7 g. of butadiene, and 7 g. of isoprene were added, and the resulting mixture was subjected to the process set forth in Example 31.

As a result, a trimer fraction of 9.5 g. (68% yield) was obtained and found to contain 40% of monomethylcyclododecatriene, 1% of dimethylcyclododecatriene, and 59% of cyclododecatriene.

EXAMPLE 41

To 50 cc. of toluene, 1-millimol of titanium phenoxytrichloride, 0.3 millimol of ethane-1,2-dithiocyanate, 3 millimols of ethyluminium sesquichloride, 7 g. of butadiene, and 7 g. of pentadiene were added, and the resulting mixture was subjected to the process specified in Example 31.

As a result, a trimer fraction of 11.6 g. (83% yield) was obtained and found to contain 35% of monomer monomethylcyclododecatriene, 2% of dimethylcyclododecatriene, and 63% of cyclododecatriene.

EXAMPLE 42

To 50 cc. of benzene, 1 millimol of titanium tetrachloride, 0.3 millimol of adiponitrile, 3 millimols of diethylaluminium chloride, and 14 g. of B–B fraction (butadiene=35%, butene-1=17%, butene-2=8%, isobutylene=30%, and butane=8%) were added, and the resulting mixture was subjected to the process set forth in Example 31.

As a result, a trimer fraction in a quantity of 4.6 g. was obtained and found to contain 94% of cyclododecatriene and 6% of a linear $C_{12}$. The yield of the cyclododecatriene with respect to the starting material butadiene was 88%.

EXAMPLE 43

To 50 cc. of benzene, 1 millimol of titanium tributoxychloride, 0.2 millimol of adiponitrile, 6 millimols of diethylaluminium chloride, and 9 g. of pentadiene were added, and the resulting mixture was processed in accordance with procedure set forth in Example 31.

As a result, a trimer fraction of 3.25 g. (36% yield) was obtained and found to contain 87% of trimethylcyclododecatriene and 13% of a linear $C_{15}$.

REFERENCE EXAMPLE 4

When the process of Example 31 was carried out without the addition of adiponitrile, the quantity of the trimer fraction thus obtained under the otherwise same conditions was 13.6 g. corresponding to a 59% yield, which is considerably lower than the 82% yield in Example 31.

REFERENCE EXAMPLE 5

When the process of Example 32 was carried out without the addition of adiponitrile, the quantity of the trimer fraction thus obtained was 13.5 g. corresponding to a yield of 53%, which is considerably lower than the 89% yield in Example 32.

REFERENCE EXAMPLE 6

When the process of Example 42 was carried out without the addition of adiponitrile, the quantity of the trimer fraction thus obtained was 3.2 g. (cyclododecatriene selectivity being 89%), and the cyclododecatriene yield with respect to the starting material butadiene was 58%, which is considerably lower than the 88% yield in Example 42.

REFERENCE EXAMPLE 7

When the process of Example 43 was carried out without the addition of adiponitrile, the trimer fraction thus obtained weighed 1.7 g., corresponding to a yield of 19%, which is much lower than the 36% yield in Example 43.

What is claimed is:

1. In a method for producing cyclic trimers from at least one 1,3-diene by trimerization in the presence of a catalyst comprising a titanium compound selected from the group consisting of a titanium compound of the formula, $TiOR_nX_{4-n}$, and a titanium compound of the formula, $TiOX_2$, wherein R is a hydrocarbon radical, X is a halogen and n is an integer of 0 to 4, and an organoaluminum compound of the formula, $AlR'_2Z$, wherein R' is a hydrocarbon radical and Z is a halogen, the improvement which comprises carrying out the trimerization in the presence of a catalyst comprising said titanium compound, said organoaluminum compound and an electron donor compound selected from the group consisting of 2-substituted pyridine in which said substituent is hydroxyl-lower-alkyl, formyl or benzoyl, and 2-substituted thiophene in which said substituent is benzoyl, carboxyl, benzoyl-methyl carbonyl and lower-acylmethyl carbonyl.

2. A process as claimed in claim 1 in which said R is a hydrocarbon radical selected from the group consisting of lower alkyls, phenyl and tolyl, X is chlorine, R' is a lower alkyl, and Z is chlorine.

3. A process as claimed in claim 1 in which said electron-donor component (4) is a compound of the general formula

in which Y is selected from the group consisting of hydroxyl lower alkyls, formyl and benzoyl.

4. A process as claimed 1 in which said electron-donor component is a compound of the general formula

in which Y is selected from the group consisting of benzoyl, benzoyl-methyl carbonyl, lower-acylmethyl carbonyl and carboxyl.

5. A process as claimed in claim 1 in which said 1,3-diene is selected from the group consisting of 1,3-butadiene and a mixture of 1,3-butadiene and a monomethyl-substituted 1,3-butadiene.

6. A process as claimed in claim 1 in which said 1,3-diene is butadiene in admixture with $C_4$ olefins.

7. A process as claimed in claim 1 in which said catalyst is formed by first causing said components (I) and (III) to react to form a complex compound and then combining said complex compound with said component (II).

8. A process as claimed in claim 1 in which said cyclotrimerisation is carried out in a liquid reaction medium.

9. In a method for producing cyclic trimers from at least one, 1,3-diene by trimerization in the presence of a catalyst, which comprises a titanium compound selected from the group consisting of a titanium compound of the formula $TiOR_nX_{4-n}$ and a titanium compound of the formula, $TiOX_2$, wherein R is a hydrocarbon radical, X is a halogen and n is an integer of 0 to 4, and an organoaluminum compound of the formula $AlR'_2Z$ wherein R' is a hydrocarbon radical and Z is a halogen, the improvement which comprises carrying out the trimerization in the presence of a catalyst comprised of said titanium compound, said organoaluminum compound and a phosphite selected from di(lower-alkyl) phosphite in which each alkyl group contains 1 to 6 carbon atoms, diphenyl phosphites and ditolyl phosphites.

10. A process as claimed in claim 9 in which said R is a hydrocarbon radical selected from the group consisting of lower alkyls, phenyl and tolyl, X is chlorine, R' is a lower alkyl and Z is chlorine.

11. A process as claimed in claim 9 in which said 1,3-diene is selected from the group consisting of 1,3-butadiene and a mixture of 1,3-butadiene and a monomethyl-substituted 1,3-butadiene.

12. A process as claimed in claim 9 in which said 1,3-diene is butadiene in admixture with $C_4$ olefins.

13. A process as claimed in claim 9 in which cyclotrimerization is carried out in a liquid reaction medium.

14. In a method for producing cyclic trimers from at least one 1,3-diene by trimerization in the presence of a catalyst, which comprises a titanium compound selected from the group consisting of a titanium compound of the formula $TiOR_nX_{4-n}$ and a titanium compound of the formula, $TiOX_2$, wherein R is a hydrocarbon radical, X is a halogen and n is an integer of 0 to 4, and an organoaluminum compound of the formula $AlR'_2Z$, wherein R' is a hydrocarbon radical and Z is a halogen, the improvement which comprises carrying out the trimerization in the presence of a catalyst comprising said titanium compound, said organoaluminum compound and an alkylene dinitrile in which said alkylene separates the two nitrile groups and contains 1 to 4 carbon atoms.

15. A process as claimed in claim 14 in which said R is a hydrocarbon radical selected from the group consisting of lower alkyl, phenyl and tolyl, X is chlorine, R' is a lower alkyl and Z is chlorine.

16. A process as claimed in claim 14 in which said 1,3-diene is selected from the group consisting of 1,3-butadiene and a mixture of 1,3-butadiene and a monomethyl-substituted 1,3-butadiene.

17. A process as claimed in claim 14 in which said 1,3-diene is butadiene in admixture with $C_4$ olefins.

18. A process as claimed in claim 14 in which cyclotrimerization is carried out in a liquid reaction medium.

References Cited
UNITED STATES PATENTS

| | | | |
|---|---|---|---|
| 3,076,045 | 1/1963 | Schneider et al. | 260—666 B |
| 3,149,173 | 9/1964 | Wittenberg et al. | 260—666 B |
| 3,214,484 | 10/1965 | Wittenberg et al. | 260—666 B |
| 3,381,045 | 4/1968 | Koch et al. | 260—666 B |
| 3,381,047 | 4/1968 | Eleuterio et al. | 260—666 B |

DELBERT E. GANTZ, Primary Examiner

V. O'KEEFE, Assistant Examiner